United States Patent
Bryant

(10) Patent No.: US 10,190,821 B2
(45) Date of Patent: Jan. 29, 2019

(54) METHOD FOR DETECTION OF THE LOSS OF AN ELECTRIC ARC FURNACE MEASUREMENT REFERENCE

(71) Applicant: Showa Denko Carbon Germany GmbH, Meitingen (DE)

(72) Inventor: Billy Bryant, Rock Falls, IL (US)

(73) Assignee: Showa Denko Carbon GmbH, Meitingen (DE)

( * ) Notice: Subject to any disclaimer, the term of this patent is extended or adjusted under 35 U.S.C. 154(b) by 754 days.

(21) Appl. No.: 14/629,948

(22) Filed: Feb. 24, 2015

(65) Prior Publication Data

US 2016/0131428 A1   May 12, 2016

Related U.S. Application Data

(60) Provisional application No. 62/076,278, filed on Nov. 6, 2014.

(51) Int. Cl.

| | |
|---|---|
| H05B 7/148 | (2006.01) |
| H05B 7/144 | (2006.01) |
| F27B 3/28 | (2006.01) |
| H05B 7/152 | (2006.01) |
| H05B 7/18 | (2006.01) |
| F27B 3/08 | (2006.01) |

(52) U.S. Cl.
CPC .............. *F27B 3/28* (2013.01); *F27B 3/085* (2013.01); *H05B 7/144* (2013.01); *H05B 7/152* (2013.01); *H05B 7/18* (2013.01); *Y02P 10/256* (2015.11); *Y02P 10/259* (2015.11)

(58) Field of Classification Search
CPC ........ H05B 7/144; H05B 7/148; H05B 7/152; H05B 7/18; F27B 3/085; F27B 3/28; Y02P 10/256; Y02P 10/259
USPC ..... 373/70, 102, 103, 104, 105, 108, 60, 65, 373/71, 72
See application file for complete search history.

(56) References Cited

U.S. PATENT DOCUMENTS

| | | | | |
|---|---|---|---|---|
| 3,435,121 A | * | 3/1969 | Jackson ................. | H05B 7/152 373/105 |
| 3,769,440 A | | 10/1973 | Goodman | |
| 5,155,740 A | * | 10/1992 | Ao ........................ | C21C 5/5229 373/102 |

FOREIGN PATENT DOCUMENTS

WO    00/33616 A1    6/2000

\* cited by examiner

*Primary Examiner* — Hung D Nguyen
(74) *Attorney, Agent, or Firm* — Taylor IP, P.C.

(57) ABSTRACT

An electric arc furnace (EAF) including a raw material container, a set of electrodes, a set of electrical potential transformers, and a reference signal verification device. The set of electrodes are configured to be controllably extended toward the raw material container. The set of electrical potential transformers are correspondingly coupled to the set of electrodes. The reference signal verification device is configured to carry out the steps of reading a reference signal value coming from the raw material container; comparing the reference signal value to an approximated value; and determining that there is a loss of the reference signal if the reference signal value is not within a predetermined amount of the approximated value.

20 Claims, 2 Drawing Sheets

EAF Voltage Measurement Topology

EAF Voltage Measurement Topology

B - Phase Touching Scrap

METHOD FOR DETECTION OF THE LOSS OF AN ELECTRIC ARC FURNACE MEASUREMENT REFERENCE

This is a non-provisional application based upon U.S. provisional patent application Ser. No. 62/076,278, entitled "METHOD FOR DETECTION OF THE LOSS OF AN ELECTRIC ARC FURNACE MEASUREMENT REFERENCE", filed Nov. 6, 2014, which is incorporated herein by reference.

BACKGROUND OF THE INVENTION

1. Field of the Invention

The present invention relates to control systems for electric arc furnaces for the detection of the integrity of the reference signal line.

2. Description of the Related Art

An electric arc furnace (EAF) is a furnace that heats material by way of an electric arc. Arc furnaces range in size from small units of approximately one ton capacity up to about 400 ton units used for secondary steelmaking. On a much smaller scale arc furnaces for use in research laboratories and by dentists have a capacity of tens of grams. Industrial electric arc furnace temperatures can typically be up to 1,800° C., and laboratory units can exceed 3,000° C. Arc furnaces directly expose material to an electric arc, and the current in the furnace electrodes pass through the material.

An EAF generally includes a refractory-lined vessel covered with a retractable roof, through which one or more graphite electrodes enter the furnace. The EAF is primarily split into three sections: the shell, which consists of the sidewalls and lower steel "bowl"; the hearth, which is the refractory layer that lines the lower bowl; and the roof, which may be refractory-lined and/or water-cooled, and can be shaped as a section of a sphere, or as a conical section. The roof also supports the refractory through which the graphite electrodes enter.

A typical alternating current EAF is powered by a three-phase electrical supply having three electrodes that enter through the roof. Electrodes are typically round in cross-section, and are arranged in segments with threaded couplings, so that as the electrodes wear, new segments can be added. The arc forms between the material in the EAF and the electrode, the material is heated both by current passing through the material and by the radiant energy from the arc. The electrodes are raised and lowered by a positioning system, which may use either electric winches or hydraulic cylinders. The regulating system maintains approximately constant current and power input during the melting of the material, even though scrap may move under the electrodes as it melts. The mast arms holding the electrodes can be coupled with busbars to carry the electrical current or the mast arms may be "hot arms", where the whole arm carries the current. Hot arms may consist of copper-clad steel or aluminum. The electrodes move up and down for regulation of the arc, and are raised to allow removal of the furnace roof.

The EAF is often coupled to a tilting platform so that the liquid steel can be poured therefrom. A typical EAF could have a transformer rated about 60,000,000 volt-amperes (60 MVA), with a secondary voltage between 400 and 900 volts and a secondary current in excess of 44,000 amperes. Such a furnace would be expected to produce a quantity of 80 tons of liquid steel in approximately 50 minutes from charging the EAF with cold scrap to tapping the furnace. In comparison, basic oxygen furnaces can have a capacity of 150-300 tons per batch, or "heat", and can produce a heat in 30-40 minutes.

The process to melt the steel includes the lowering of the electrodes onto the scrap, causing an arc to be struck and the electrodes are then set to "bore" into the layer of scrap at the top of the furnace. Typically lower voltages are selected for this first part of the operation to protect the roof and walls from excessive heat and damage from the arcs. Once the electrodes have reached the heavy melt at the base of the furnace and the arcs are shielded by the scrap, the voltage is increased and the electrodes are raised slightly, lengthening the arcs and increasing power to the melt. This enables a molten pool to form more rapidly, reducing tap-to-tap times.

A reference signal is used to control the EAF operation in the control of the movement of the electrodes during the heating process. The loss of the reference signal line can cause the EAF to operate at less efficiency and result in unneeded wear on the electrodes.

What is needed in the art is an apparatus to detect the loss of the reference signal line so that the EAF performance can be maintained, to efficiently produce molten steel.

SUMMARY OF THE INVENTION

The present invention provides a device that detects the integrity or loss of the reference signal line for an electric arc furnace.

The present invention in one form is an electric arc furnace (EAF) including a raw material container, a set of electrodes, a set of electrical potential transformers, and a reference signal verification device. The set of electrodes are configured to be controllably extended toward the raw material container. The set of electrical potential transformers are correspondingly coupled to the set of electrodes. The reference signal verification device is configured to carry out the steps of reading a reference signal value coming from the raw material container; comparing the reference signal value to an approximated value; and determining that there is a loss of the reference signal if the reference signal value is not within a predetermined amount of the approximated value.

The present invention in another form is a reference signal verification device to verify a reference signal coming from an electric arc furnace having electrodes and potential transformers. The device includes a controller configured to carry out the steps of: reading a reference signal value coming from the electric arc furnace; comparing the reference signal value to an approximated value; and determining that there is a loss of the reference signal if the reference signal value is not within a predetermined amount of the approximated value.

The present invention in yet another form is a method for detecting the loss of a reference signal associated with an electric arc furnace. The method including the steps of: contacting raw material in a container with an electrode, the electrode being one of multiple electrodes; reading a reference signal value; comparing the reference signal value to an approximated value; and determining that there is a loss of the reference signal if the reference signal value is not within a predetermined amount of the approximated value.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
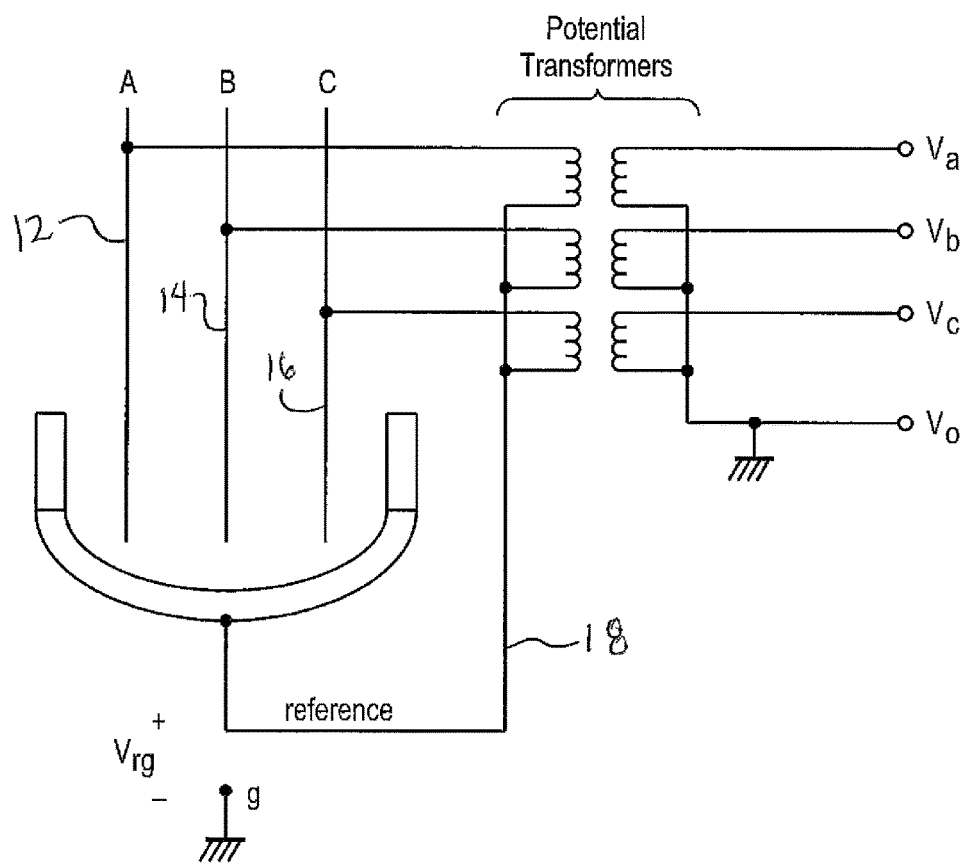
FIG. 1 is a schematic depiction of an electric arc furnace using an embodiment of a method of determining a loss of a reference signal of the present invention.

Referring now to the drawings, and more particularly to FIG. 1, there is shown an Electric Arc Furnace (EAF) 10 having electrodes 12, 14 and 16.

The electrical secondary system of an AC EAF is an ungrounded three-phase delta to wye circuit. The three arcs in the EAF form an ungrounded wye electrical connection on the scrap or liquid steel. EAF electrode regulation systems utilize an electrical connection to the bottom of the EAF for establishing a measurement reference. The reference connection is made using an insulated cable 18, which is isolated from the electrical ground.

When the tip of one of the electrodes touches scrap or liquid steel, the voltage magnitude for that phase will approach zero due to the measurement reference becoming energized by the phase voltage. The EAF electrode regulation system uses the zero voltage measurement as an indication to know that the electrode tip is touching scrap or liquid steel and stops lowering the electrode immediately.

The EAF measurement reference is connected using an insulated cable that is routed between the bottom of the EAF and the measurement system. The cable is partially routed through a very harsh environment and is frequently damaged by liquid steel or radiative heat.

There are two ways that an AC EAF electrode regulation system can detect when an electrode touches scrap:

Electrically: when the voltage magnitude for the phase goes to zero, indicating conduction is taking place.

Hydraulics: when the hydraulic pressure changes, indicating physical contact.

When the reference signal cable is damaged the EAF phase voltage measurement no longer becomes zero when the electrode tip touches scrap. However, voltage is still measured by the electrode regulation system and the system appears to be functioning normally. The problem with the prior art method is that the electrode regulation system has lost its ability to electrically detect when the tip of the electrode is touching scrap. The regulation system must instead rely on the hydraulic pressure change. The disadvantage of relying on the hydraulic approach is that the electrode is already being driven into scrap when the pressure decreases. This results in a much higher electrode breakage rate.

Damage to the measurement reference cable frequently goes unnoticed for some time because the EAF control system will continue to operate (although without a proper reference for the electrical regulation control). Very few operators check the integrity of the measurement reference on a regular basis.

Figure 2:
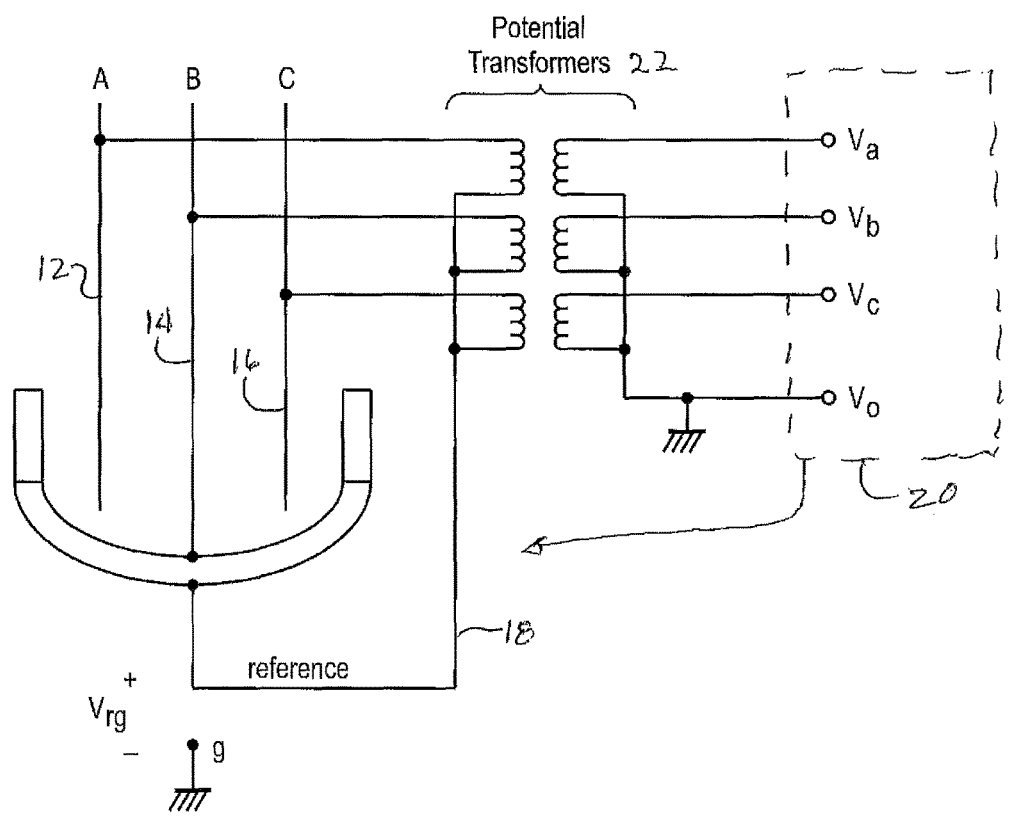
FIG. 2 is a schematic depiction of the present invention schematically illustrating an electrode conducting current through scrap (not shown) to the furnace crucible.

In the present invention, as the EAF electrode tips, such as the tip of electrode 14 touches scrap, as schematically depicted in FIG. 2 (depicted as electrically contacting the raw material container), or when it comes very close to touching scrap during normal operation, the invention makes use of the fact that as one tip touches scrap (or liquid) the voltage on the other two phases will increase by 1.732 and their phase angles will shift by 30 degrees, as detected by detection system 20. This results in changes to the zero, positive and negative sequence symmetric component voltages that can be measured and detected during normal operation. Reference signal detection device 20 may be a controller 20 that carries out the steps of the present invention, or the steps of the method of the present invention may be carried out by an existing controller of the EAF.

It is noted that the measured voltage magnitudes and phases will not be impacted by an electrode tip touching scrap when the EAF measurement reference is damaged. The absence of voltage magnitude increase and phase shift is utilized to indicate damage to the measurement reference since this change in voltage magnitude and phase occurs during normal operation with a serviceable measurement reference.

The symmetric components of voltage are utilized by system 20 during EAF operation to test for damage to the EAF measurement reference. When the EAF measurement reference is serviceable and one of the phases contacts scrap the symmetric components of voltage will be equivalent to the following for a positive phase rotation sequence (ABC phases):

$V0 = V \angle 180$ degrees (zero sequence voltage)

$V1 = V \angle 0$ degrees (positive sequence voltage)

$V2 = 0$ (negative sequence voltage)

Where V represents the EAF transformer secondary phase to reference voltage (Vrg) magnitude and the $\angle$ symbol represents phase angle. Note that the quantities for V1 and V2 will be swapped in a negative phase rotation sequence (ACB).

The following is an outline of one embodiment of an algorithm used by system 20 to detect damage to the EAF measurement reference:

1. Set a counter equal to zero.
2. Start production of a heat of steel within the EAF.
3. Measure the EAF secondary voltages while the EAF is in operation.
4. Compute the symmetric components of voltage.
5. Compare the magnitude and phase angle of the zero sequence, positive sequence and negative sequence voltages. If the zero and positive sequence voltage magnitudes are approximately equivalent AND the difference between the zero and positive sequence voltage phase angle is approximately 180 degrees AND the negative sequence voltage magnitude is approximately zero: increment the counter by one.
6. Complete production of the heat.
7. Inspect the value of the counter. If it is greater than zero then go to step 1 for the next heat. If the counter remains at zero for some number of heats then consider the measurement reference damaged and system 20 notifies the operator.

It is also contemplated to detect damage to the EAF measurement reference by utilizing phase voltage and/or angle directly as opposed to the symmetric components of voltage. The advantage to the symmetric components approach is that the EAF transformer secondary voltage for a given tap or taps does not need to be known and results in a more accurate indication.

It is also possible to detect damage to the EAF measurement reference by utilizing phase voltage and/or angle directly as opposed to the symmetric components of voltage. The advantage to the symmetric components approach is that the EAF transformer secondary voltage for a given tap or taps does not need to be known and results in more accurate indication.

Now more specifically three methods of carrying out the invention are discussed.

Method 1: Detection by a Direct Measurement of Zero Sequence Voltage:

In this method the voltage shown in FIG. 2 as Vrg is directly measured to indicate that the reference is serviceable. Vrg is the voltage formed between the reference and ground when one of the energized phases contacts scrap or liquid resulting in the energizing of the reference. Vrg is approximately zero during normal EAF operation and will always be zero if the reference is damaged upstream of the measurement location (toward the EAF).

FIG. 2 schematically details B-phase contacting scrap or liquid metal and energizing the measurement reference; however, A or C phases contacting scrap or liquid would produce the same result. Vrg can be measured manually or automatically at some fixed interval. If the value of Vrg does not exceed some threshold value (50 volts for example) for some fixed interval of time (1 batch production cycle for example) the measurement reference would be considered damaged and local staff notified.

The following is an outline of an algorithm to automatically detect damage to the EAF voltage measurement reference by Method 1:

1. Set a counter equal to zero.
2. Start production of a heat of steel with the EAF.
3. Measure the voltage between the reference and ground (Vrg). If the voltage exceeds a minimum threshold then increment the counter.
4. Complete production of the heat (or some number of heats).
5. If the counter is greater than zero the reference signal line is verified as being good and the method then goes to step 1 for the next heat. If the counter is equal to zero then assert damage to the reference signal line to the operator.

Method 2: Detection by Measured Voltage Magnitude:

In this method the voltage magnitude (and possibly phase) are measured and utilized to indicate that the measurement reference is serviceable. Assume that the potential transformers 22 detailed in FIG. 2 have a 1:1 ratio in this example; if the ratio is different then the equations are modified appropriately.

Assume the following per-unit, positive phase sequence quantities for the EAF secondary voltages:

$VA = 1.0 /\_0$ per-unit $VB = 1.0 /\_-120$ per-unit $VC = 1.0 /\_120$ per-unit where the /_ symbol indicates phase angle in degrees. B-phase is contacting scrap or liquid metal as detailed in FIG. 2, resulting in the energizing of the reference.

Under nominal EAF operating conditions (no phases touching scrap or liquid) the measured voltages would be the following:

$Va0 = (VA - V\text{reference})/PT$ ratio $= (1.0/\_0 - 0.0)/1 = 1.0/\_0.0$ per-unit $Vb0 = (VB - V\text{reference})/PT$ ratio $= (1.0/\_-120 - 0.0)/1 = 1.0/\_\_120$ per-unit $Vc0 = (VC - V\text{reference})/PT$ ratio $= (1.0/\_120 - 0.0)/1 = 1.0/\_120$ per-unit With B-phase contacting scrap or liquid calculation of the measured voltages is as follows:

$V\text{reference} = VB$ $Va0 = (VA - V\text{reference})/PT$ ratio $= (VA - VB)/1 = 1.0/\_0 - 1.0/\_-120$ per-unit $= 1.732/\_{30}$ per-unit $Vb0 = (VB - V\text{reference})/PT$ ratio $= (VB - VB)/1 = 0.0/\_0$ per-unit $Vc0 = (VC - V\text{reference})/PT$ ratio $= (VC - VB)/1 = 1.0/120 - 1.0/\_\_120$ per-unit $= 1.732/\_90$ per-unit The calculation indicates that B-phase voltage magnitude will be measured as 0V and that A-phase and C-phase magnitude will be measured as 173.2 percent of the nominal EAF secondary line to reference voltage or alternatively the metered A-phase and C-phase voltage will be the full line to line EAF transformer secondary voltage. Additionally the difference in phase angle between the two phases not contacting scrap will be 60 degrees. As an example assume that the selected EAF transformer secondary voltage is 1000V line to line and that B-phase contacts scrap or liquid. The magnitude of Va0 and Vc0 would be 1000V and the phase difference would be 60 degrees.

The absolute value of the measured phase angle cannot be relied upon due to differences in behavior between power meters. In most cases the power meter would utilize A-phase as the reference in the above example. This would result in a phase angle of 0.0 degrees for Va0 and 60.0 degrees for Vc0. However, this behavior cannot be assumed to be equivalent between manufacturers and so only the difference in phase angle can be reliably utilized.

The following is an outline of an algorithm to automatically detect damage to the EAF voltage measurement reference utilizing voltage magnitude by this Method:

1. Set a counter equal to zero.
2. Start production of a heat of steel with the EAF.
3. Measure the phase voltages. If the voltage on any phase is approximately equivalent to the EAF transformer secondary line-to-line voltage then increment the counter. Alternatively, set a voltage threshold above the maximum utilized voltage and increment the counter if any of the measured phase voltages exceed this threshold.
4. Complete production of the heat (or some number of heats).
5. If the counter is greater than zero then the integrity of the reference signal line is confirmed and the method goes to step 1 for the next heat. If the counter is equal to zero then assert damage of the reference signal line to the operator.

Method 3: Detection by Measured Symmetric Voltage Components:

In this method the symmetric components of voltage are measured and utilized to indicate that the measurement reference is serviceable. This method is preferable because it does not require knowledge of the EAF transformer secondary voltage. Using the situation detailed in FIG. 2 and the same values as in Method 2:

Zero sequence voltage is calculated as follows:

$3V0 = Va0 + Vb0 + Vc0 = 1.732/\_30 + 0.0/\_0.0 + 1.732/\_90$ per-unit $= 3/\_60$ per-unit $V0 = 1/\_60$ per-unit $=$ zero sequence voltage Positive sequence voltage is calculated as follows:

$$3V1=Va0+(1/\_120)*Vb0+(1/\_240)*Vc0=1.732/\_{-30}+(1/\_120)(0/\_0)+(1/\_240)(1.732/\_90) \text{ per-unit}$$

$$V1=1/\_0 \text{ per-unit=positive sequence voltage}$$

Negative sequence voltage is calculated as follows:

$$3V2=Va0+(1/\_240)*Vb0+(1/\_120)*Vc0=1.732/\_30+(1/\_240)(0/\_0)+(1/\_120)(1.732/\_90) \text{ per-unit}$$

$$V2=0.0/\_0 \text{ per-unit=negative sequence voltage}$$

The calculations show that with B-phase contacting scrap or liquid metal the magnitude of the zero sequence voltage is equivalent to the magnitude of the positive sequence voltage and the phase angle between the positive and negative sequence voltages is 60 degrees as above. The magnitude of the zero sequence voltage will be approximately equivalent to the magnitude of the positive sequence voltage anytime one of the phases contact the scrap or liquid metal and this confirms that the measurement reference line is serviceable.

The following is an outline of an algorithm to automatically detect damage to the EAF voltage measurement reference utilizing the symmetric components of voltage:
1. Set a counter equal to zero.
2. Start production of a heat of steel with the EAF.
3. Measure the symmetric components of voltage. If the zero sequence and positive sequence voltage magnitudes are approximately equivalent then increment the counter.
4. Complete production of the heat (or some number of heats).
5. If the counter is greater than zero the reference signal line is confirmed as being good and the method then goes to step 1 for the next heat. If the counter is equal to zero then damage to the reference signal line has been detected and the operator is notified.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION

10 Electric Arc Furnace (EAF)
12 Electrode
14 Electrode
16 Electrode
18 Reference line or signal
20 Controller/Reference signal verifying device
22 Transformers

What is claimed is:

1. An AC electric arc furnace, comprising:
   a raw material container;
   a set of electrodes configured to be controllably extended toward said raw material container;
   a set of electrical potential transformers correspondingly coupled to said set of electrodes; and
   a reference signal verification device directly electrically connected to said transformers, said reference signal verification device being configured to read a reference signal value coming from said raw material container, compare said reference signal value to an approximated value, and determine that there is a loss of the reference signal due to damage of the direct electrical connection or disconnection of the direct electrical connection if said reference signal value is not within a predetermined amount of said approximated value.

2. The AC electric arc furnace according to claim 1, wherein said approximated value is a threshold value.

3. The AC electric arc furnace according to claim 2, wherein said threshold value is 50 volts.

4. The AC electric arc furnace according to claim 1, wherein said reference signal verification device is further configured to approximate said approximated value dependent upon electrical values measured on said electrodes to result in said approximated value.

5. The AC electric arc furnace according to claim 4, wherein said electrical values measured is a phase angle difference between said electrodes.

6. The AC electric arc furnace according to claim 4, wherein said electrical values measured have a symmetry in the phase differences between the electrodes indicating that the reference signal is verified.

7. The AC electric arc furnace according to claim 6, wherein said symmetry in the phase differences indicates that the reference signal is verified.

8. A reference signal verification device to verify a reference signal coming from an AC electric arc furnace having electrodes and potential transformers, the device comprising:
   a controller configured to read a reference signal value coming from a raw material container coupled to the transformers, compare said reference signal value to an approximated value, and determine that there is a loss of the reference signal due to damage of a direct electrical connection to the transformers or a disconnection of the direct electrical connection to the transformers if said reference signal value is not within a predetermined amount of said approximated value.

9. The reference signal verification device according to claim 8, wherein said approximated value is a threshold value.

10. The reference signal verification device according to claim 9, wherein said threshold value is 50 volts.

11. The reference signal verification device according to claim 8, wherein said controller is further configured to approximate what a reference signal value should be dependent upon electrical values measured on the electrodes resulting in said approximated value.

12. The reference signal verification device according to claim 11, wherein said electrical values measured is a phase angle difference between said electrodes.

13. The reference signal verification device according to claim 11, wherein said electrical values measured have a symmetry in the phase differences between the electrodes indicating that the reference signal is verified.

14. The reference signal verification device according to claim 13, wherein said symmetry in the phase differences indicates that the reference signal is verified.

15. A method for detecting the loss of a reference signal associated with an AC electric arc furnace, the method comprising the steps of:
   contacting raw material in a container with an electrode, said electrode being one of multiple electrodes, a set of electrical potential transformers correspondingly coupled to said multiple electrodes;

reading a reference signal value from a direct electrical connection to at least one of the set of electrical potential transformers;

comparing said reference signal value to an approximated value; and determining that there is a loss of the reference signal due to damage of the direct electrical connection or disconnection of the direct electrical connection if said reference signal value is not within a predetermined amount of said approximated value.

16. The method according to claim 15, wherein said approximated value is a threshold value.

17. The method according to claim 16, wherein said threshold value is 50 volts.

18. The method according to claim 15, further comprising the step of approximating what a reference signal value should be dependent upon electrical values measured on said electrodes resulting in said approximated value.

19. The method according to claim 18, wherein said electrical values measured is a phase angle difference between said electrodes.

20. The method according to claim 18, wherein said electrical values measured have a symmetry in the phase differences between the electrodes indicating that the reference signal is verified.

* * * * *

UNITED STATES PATENT AND TRADEMARK OFFICE
CERTIFICATE OF CORRECTION

PATENT NO. : 10,190,821 B2
APPLICATION NO. : 14/629948
DATED : January 29, 2019
INVENTOR(S) : Bryant Page 1 of 1

It is certified that error appears in the above-identified patent and that said Letters Patent is hereby corrected as shown below:

In the Specification

Column 6
At Line 2, please delete "1 = 1.0 /__120 per-unit", and substitute therefore
-- 1 = 1.0 /_-120 per-unit --;
At Line 11, please delete "per-unit = 1.732 /$_{30}$ per-unit", and substitute therefore
-- per-unit = 1.732 /_30 per-unit --; and
At Lines 16-17, please delete "= 1.0 /120 – 1.0 /__120 per-unit", and substitute therefore
-- = 1.0 /_120 – 1.0 /_-120 per-unit --.

In the Claims

Column 7
At Line 2, please delete "= 1.732 /$_{30 +}$", and substitute therefore -- = 1.732 /_30 + --.

Signed and Sealed this
Thirteenth Day of October, 2020

Andrei Iancu
*Director of the United States Patent and Trademark Office*